(12) United States Patent
Nielsen et al.

(10) Patent No.: US 8,627,842 B2
(45) Date of Patent: Jan. 14, 2014

(54) MIX-PROOF VALVE

(75) Inventors: Jesper Bak Nielsen, Kolding (DK); Bo Boye Busk Jensen, Rödovre (DK); Henrik Falster-Hansen, Töllöse (DK)

(73) Assignee: Alfa Laval Corporate AB, Lund (SE)

( * ) Notice: Subject to any disclaimer, the term of this patent is extended or adjusted under 35 U.S.C. 154(b) by 67 days.

(21) Appl. No.: 13/499,453

(22) PCT Filed: Sep. 20, 2010

(86) PCT No.: PCT/SE2010/051006
§ 371 (c)(1),
(2), (4) Date: May 11, 2012

(87) PCT Pub. No.: WO2011/040862
PCT Pub. Date: Apr. 7, 2011

(65) Prior Publication Data
US 2012/0211092 A1   Aug. 23, 2012

Related U.S. Application Data

(60) Provisional application No. 61/248,012, filed on Oct. 2, 2009.

(30) Foreign Application Priority Data

Oct. 2, 2009  (SE) ........................................ 0950721

(51) Int. Cl.
*F16K 11/20*   (2006.01)
*B08B 9/027*   (2006.01)
(52) U.S. Cl.
USPC ................... 137/240; 137/614.18; 134/166 C
(58) Field of Classification Search
USPC ....................... 137/238, 240, 614.18, 614.17; 134/166 C
See application file for complete search history.

(56) References Cited

U.S. PATENT DOCUMENTS

| 6,178,986 B1 * | 1/2001 | Burmester ..................... 137/240 |
| 6,676,047 B1 * | 1/2004 | Lindholm Jensen et al. .. 137/240 |
| 8,210,197 B2 * | 7/2012 | Jensen et al. ................... 137/240 |

FOREIGN PATENT DOCUMENTS

| DE | 4203723 A1 | 8/1993 |
| DE | 20317079 U1 | 2/2004 |
| EP | 745437 A1 | 12/1996 |
| WO | WO0102762 A1 | 1/2001 |

OTHER PUBLICATIONS

International Search Report for PCT/SE2010/051006 dated Jan. 26, 2011.
Written Opinion for PCT/SE2010/051006 dated Jan. 26, 2011.

* cited by examiner

*Primary Examiner* — Kevin Lee
(74) *Attorney, Agent, or Firm* — Buchanan Ingersoll & Rooney PC

(57) ABSTRACT

A cleaning arrangement (15, 26) for cleaning the drain area (13, 14) of a valve (1) with a cleaning media, where the cleaning arrangement includes at least one cleaning device (15, 26), which is preferably arranged in a mix proof valve (1) comprising at least a valve body (2), one or more valve seats (4, 7), a first valve plug (5) with a first stem (6) and a second valve plug (8) with a second stem (9), the second valve plug (8) having a central hollow part (10) for guiding the first stem (6), where the at least one cleaning device (15, 26) is rotationally arranged inside the valve housing (2), where the at least one cleaning device (15, 26) is rotated by the pressurized cleaning media and where the at least one cleaning device (15, 26) is provided with a screen arrangement (18) creating a spray of cleaning media for cleaning the drain area (13, 14) of the valve (1).

8 Claims, 4 Drawing Sheets

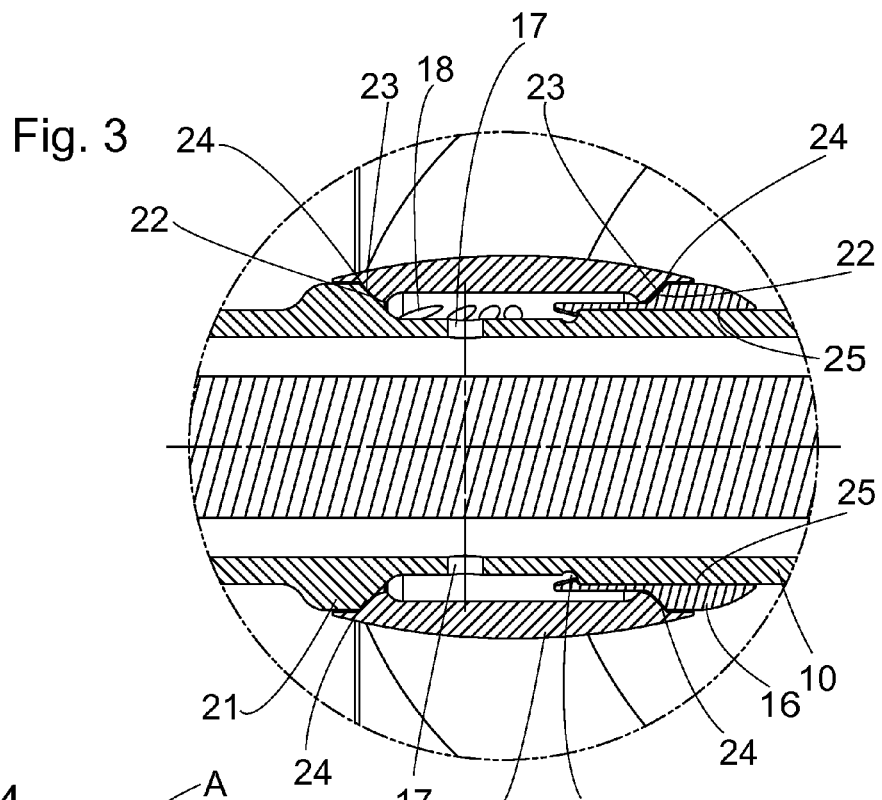
Fig. 3
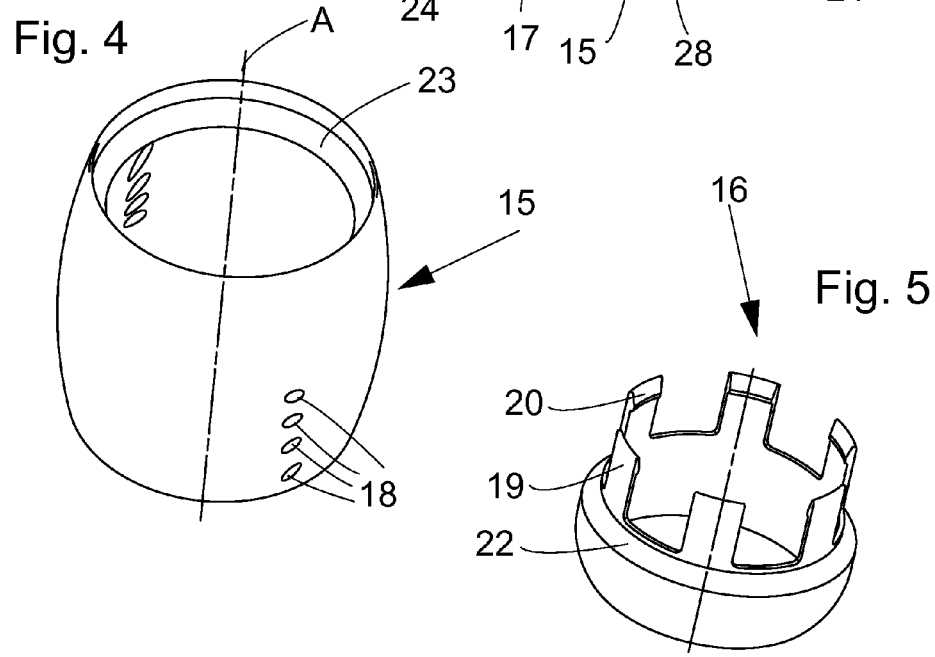
Fig. 4
Fig. 5

MIX-PROOF VALVE

The present invention relates to a valve to be used in a piping system or similar, and more specifically to a mixproof double seat valve and an arrangement for cleaning the interior of such a valve.

BACKGROUND OF INVENTION

Conventionally the external cleaning of the drain area in mix proof double seat tank outlet valves are managed with one or several nozzle(s) that can clean the surfaces of the drain area when the valve is in a closed or an open position. The external connection is normally placed on the outer spindle inside the yoke. The cleaning of the drain area, especially when the drain area has a large surface area, requires a large amount of cleaning fluid to reach all surfaces at the appropriate contact time with the cleaning liquid.

To improve the present solution the use of cleaning fluid should be minimized, time spend on the cleaning process should be shorten and the quality of the cleaning needs to be improved.

DISCLOSURE OF INVENTION

The object of the present invention is to provide a mixproof tank outlet valves which uses less cleaning fluid, shortens the cleaning process and improves the quality of cleaning.

The objective is achieved by a mix proof valve including at least one cleaning device for cleaning the interior of the valve with a cleaning media, where the valve comprise at least a valve body, one or more valve seats, a first valve plug with a first stem and a second valve plug with a second stem, the second valve plug co-operating via the second stem and a struts arrangement with a central hollow part for guiding the first stem, where the at least one cleaning device is rotationally arranged inside the valve housing, where the at least one cleaning device is rotated by the pressurized cleaning media and where the at least one cleaning device is provided with a screen arrangement creating a spray of cleaning media for cleaning the interior of the valve.

According to a first aspect of the claimed invention the screen arrangement arranged on the at least one cleaning device is formed as apertures or slits on an exterior of the at least one cleaning device, and where the apertures or slits arranged offset in relation to a rotational centerline of the at least one cleaning device.

According to a further aspect of the claimed invention the at least one cleaning device is rotationally arranged around the central hollow part of the valve, and where the cleaning media is feed to the at least one cleaning device the through the interior of the central hollow part and guided to the at least one cleaning device via at least one hole of the central hollow part.

According to yet a further aspect of the claimed invention the at least one cleaning device is rotationally locked to the central hollow part by a locking ring, where the locking ring is provided with snap means which interacts with a groove surrounding the surface of the central hollow part.

According to still a further aspect of the claimed invention the at least one cleaning device is provided with chamfered guiding surface which interacts with corresponding chamfered surfaces of the locking ring and a raising of the central hollow part, and where a gap is provided between the corresponding chamfered surfaces to center the at least one cleaning device between the locking ring and the raising of the central hollow part.

Alternatively the objective is achieved by rotationally arranging the at least one cleaning device on a piping extending parallel with the central hollow part, where the cleaning media is feed to the at least one cleaning device the through the interior of the piping. The at least one cleaning device can be rotationally locked to the piping by a ball bearing arrangement.

Another object of the invention is to provide a cleaning arrangement enabled to cleaning an interior area of a valve having a large volume and which uses less cleaning fluid, shortens the cleaning process and improves the quality of cleaning.

This objective is achieved by a cleaning arrangement for cleaning the interior area of a valve with a cleaning media, where the cleaning arrangement includes at least one cleaning device, which is preferably arranged in a mix proof valve comprising at least a valve body, one or more valve seats, a first valve plug with a first stem and a second valve plug with a second stem, the second valve plug having a central hollow part for guiding the first stem, characterized in that the at least one cleaning device is rotationally arranged inside the valve housing, where the at least one cleaning device is rotated by the pressurized cleaning media and where the at least one cleaning device is provided with a screen arrangement creating a spray of cleaning media for cleaning the interior of the valve.

The solution is to integrate one or several rotational nozzle(s) onto the outer shaft of the valve plugs. This placement ensures that the spindles do not create any shadow areas.

The rotational nozzle has the advantage that it can cover a larger surface area than a stationary nozzle can. The entire surface area within the spray pattern of the rotational nozzle is hit with cleaning media ensuring complete coverage in the spray pattern provided by the rotational nozzle. Furthermore the rotational nozzle offers the advantage that the scrubbing effect of the continuously moving hitting cleaning media jet is more effective than a stationary flow of fluid.

Further aspects of the invention is apparent from the dependent claims and the description

BRIEF DESCRIPTION OF THE DRAWINGS

Further objects, features and advantages will appear from the following detailed description of several embodiments of the invention with reference to the drawings, in which:

FIG. 3 shows a partial detailed cross sectional view of a cleaning arrangement of the valve of FIG. 1 and FIG. 2;

FIGS. 4 and 5 show perspective views of the details of the cleaning arrangement according to the invention.

DETAILED DESCRIPTION OF EMBODIMENTS

Figure 1:
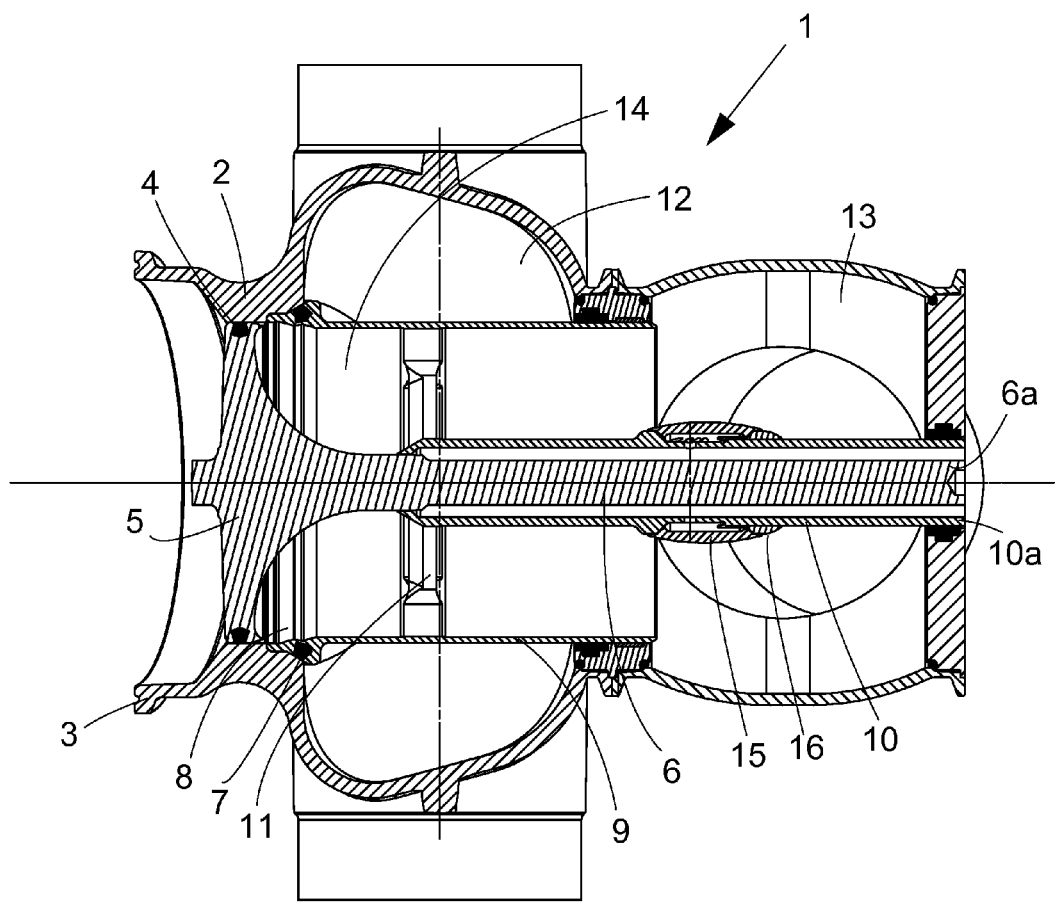
FIG. 1 shows a first cross sectional view of mix proof double seat valve according to the invention.
Figure 2:
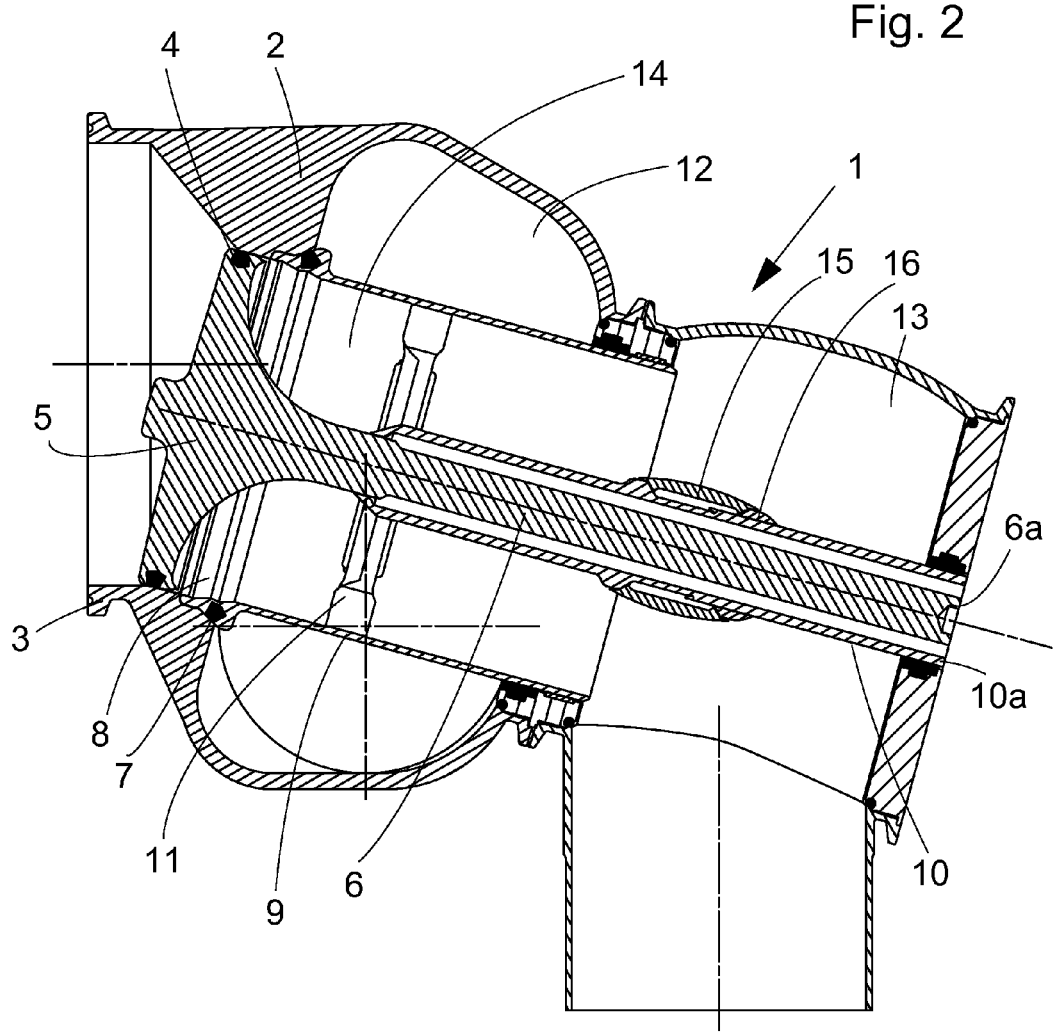
FIG. 2 shows a second an cross sectional view of mix proof double seat valve according to the invention.

FIG. 1 discloses a mix proof double seat 1. The valve 1 includes at least a valve body 2 provided with a flange 3 for connecting the valve 1 to a tank or corresponding (not shown), a first valve seat 4, first valve plug 5, a first valve stem 6, a second valve seat 7, a second valve plug 8, a second valve stem 9, where the second valve plug 8 has a central hollow part or spindle 10 for guiding the first valve stem 6. The first valve stem 6 is connected to an actuator (not shown) in an end of the first valve stem 6 opposite to the first valve plug 5. The spindle 10 is fixedly connected to the second valve stem 9 via a struts arrangement 11 in one end and to an actuator (not shown) in second end. The valve body 2 includes a product area 12 and a drain area 13, 14.

On the spindle 10 is rotationally mounted a rotational nozzle 15 for cleaning of the drain area 13, 14, best shown in FIG. 3. The rotational nozzle 15 is form as a ring-shaped device extending completely around the spindle 10, where the rotational nozzle 15 is provided with apertures 18 on selected positions of the surface of the rotational nozzle 15. The rotational nozzle 15 is rotationally mounted and guided between a bead or raising 21 of the spindle 10 and a removable locking ring 16 arranged on the spindle 10. Both raising 21 of the spindle 10 and the locking ring 16 are provided with chamfered guiding surfaces 22 that interact with corresponding chamfered guiding surfaces 23 (see FIG. 4) arranged at each end of the rotational nozzle 15. Between the guiding surface 22 (see FIG. 5) of the locking ring 16 and the corresponding guiding surface 23 of the rotational nozzle 15 is provided a gap 24. The guiding surfaces 22, 23 are the slide bearing surfaces ensuring an almost frictionless bearing for rotation.

The gap 24 ensures that the rotational nozzle 15 is centered between the guiding surfaces 22, 23 due to the pressure of the cleaning media that passes through the gap 24.

In FIG. 5 is shown that the locking ring 16 is provided with lugs or tabs 19 having protruding snaps 20, where the protruding snaps 20 enter into a groove 28 of the spindle 10 to rotationally hold the rotational nozzle 15 onto the spindle 10. The grooves extends around the spindle 10. There is also a gap 25 between the contact surfaces on the locking ring 16 and the spindle 10 to ensure that the space between the spindle 10 and the locking ring 16 can be cleaned. The locking ring 16 can be fastened to the spindle 10 with a snap arrangement as discussed above, or it can be secured with an O-ring or a similar holding means.

The rotational nozzle 15 is supplied with pressurized cleaning media through an external CIP inlet (not shown) which is connected to the spindle 10. The cleaning media is lead through the spindle 10 and further guided through one or several holes 17 arranged on the spindle 10 into the rotational nozzle 15.

In the shown embodiments the apertures 18 are arranged on the wall of the rotational nozzle 15 serves as nozzles to guide the cleaning media from the rotational nozzle 15 to form a cleaning media spray to clean the drain area 13, 14, but instead of having apertures slits or slots can be arranged on the wall of the rotational nozzle 15 to guide the cleaning media to form a cleaning media spray to clean the drain area 13. Likewise, the shown embodiment only shows one rotational nozzle arranged on the spindle 10, but according to the invention several rotational nozzles can be arranged along the spindle 10 to even better clean the drain area 13. Another way to centre the rotational nozzle 15 instead of using the raising of the spindle 10 and the locking ring 16 is using two ball bearings that holds the rotational nozzle 15 between the bearings, and where the bearings can be flushed by the cleaning media.

The principle functionality of the valve arrangement is as follows:

By activating the first valve plug 5 into the tank or corresponding to which the valve 1 is connected, a product media in the tank can be lead to the drain area 13, 14, depending on the position of the second valve plug 8, and is lead further away via piping connected to the valve 1. Likewise it is possible to lead a media from the product area 12 to the drain area 13, 14 by having the first valve plug 5 closed in the first valve seat 4, while the second valve plug 8 is activated to open the second valve seat 7.

After the valve 1 is used for product media such as sanitary products, food products or similar medias, the valve 1 needs to be cleaned. Below is described the functionality of the cleaning arrangement according to the invention, and more specifically how to clean the drain area of the valve.

To clean the drain area 13, 14 a pressurized supply of cleaning media is fed through the spindle 10 to one or several holes 17 of the spindle 10 and further guided to rotational nozzle 15. As the apertures 18 are offset from a rotational centerline A (see FIG. 4) of the rotational nozzle 15 and the spindle 10, the rotational nozzle 15 starts to rotate by the pressure from the cleaning media. By the spray created by the apertures 18 of the rotational nozzle 15 the drain area 13, 14 is cleaned from any remaining product media or similar. Cleaning media is also guided through the gaps 24 to center the rotational nozzle 15 in relation to the raising 21 of the spindle 10 and the removable locking ring 16, but cleaning media is also guided via the gap 25 between the contact surfaces of the locking ring 16 and spindle 10 to ensure that the gap 25 is cleaned. Also the spindle 10 itself is also cleaned from the media passing through the gap 24 and 25.

As discussed above there can be provided more than one rotational nozzle 15 onto the spindle 10 to better clean the drain area 13, 14 if needed.

Figure 6:
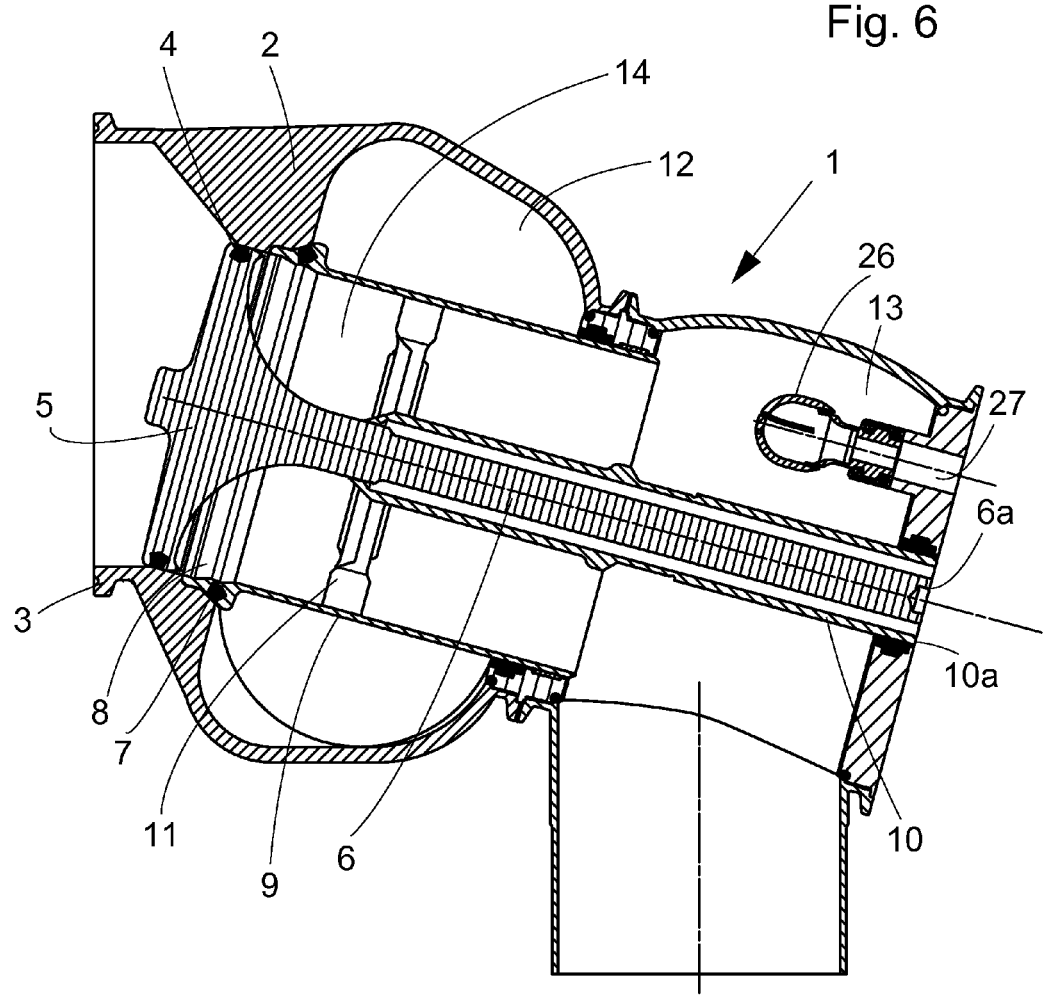
FIG. 6 shows an alternative cleaning arrangement according to the invention.

As an alternative to the above embodiment one or more fixed or rotating cleaning units, which previously are known to used used for cleaning the inside of tank chambers, can be arranged inside the valve housing (see FIG. 6). Such fixed or rotating cleaning units can also be provided as popup/retractable units, which pops up when cleaning is taking place and retracts after cleaning. An example of such fixed or rotating cleaning units is shown in FIG. 6, where a rotation spray head or spinner 26 is mounted inside the valve housing 2 and the drain area 13, 14. According to the embodiment shown in FIG. 6 the cleaning media is fed directly into the rotation spray head 26 via a piping 27 instead of being fed via the interior of the spindle 10. As with the rotational nozzle 15 the rotation spray head 26 is provided with apertures or slits on the wall of the rotation spray head 26, which apertures or slits are arranged offset a rotational centerline of the rotation spray head 26 so that the pressure of the cleaning media makes the rotation spray head 26 to rotate and creating a spray that cleans the interior of the drain area 13, 14. The rotation spray head 26 is rotationally mounted on a ball bearing arrangement, slide bearing or similar, where the ball bearing arrangement is attached to the piping 27.

The use of rotating cleaning device creating a spray to clean the interior of an apparatus as in the claimed invention can also be applied in other arrangement where a media already in supplied through an axle, spindle or shaft, but also in applications such an axle of a pump or the in- and outlet manifold of a plate heat exchanger.

The cleaning media can be only water, water including detergent or other suitable fluid combinations for cleaning the interior of the valves.

The invention is not limited to the embodiments described above and shown on the drawings, but can be supplemented and modified in any manner within the scope of the invention as defined by the enclosed claims.

The invention claimed is:

1. A mix proof valve including at least one cleaning device for cleaning the interior of the valve with a cleaning media, the valve comprising at least a valve body, one or more valve seats, a first valve plug with a first stem and a second valve plug with a second stem, the second valve plug co-operating via the second stem and a struts arrangement with a central hollow part for guiding the first stem, wherein the at least one cleaning device is rotationally arranged inside the valve body, wherein the at least one cleaning device is rotated by pressurized cleaning media and wherein the at least one cleaning device is provided with a screen arrangement creating a spray of cleaning media for cleaning a drain area of the valve.

2. The mix proof valve according to claim 1, wherein the screen arrangement arranged on the at least one cleaning device is formed as apertures or slits on an exterior of the at least one cleaning device, and wherein the apertures or slits are arranged offset in relation to a rotational centerline of the at least one cleaning device.

3. The mix proof valve according to claim 1 or claim 2, wherein the at least one cleaning device is rotationally arranged around the central hollow part of the valve, and wherein the cleaning media is fed to the at least one cleaning device through the interior of the central hollow part and guided to the at least one cleaning device via at least one hole of the central hollow part.

4. The mix proof valve according to claim 3, wherein the at least one cleaning device is rotationally locked to the central hollow part by a locking ring, and wherein the locking ring is provided with snap means which interacts with a groove surrounding a surface of the central hollow part.

5. The mix proof valve according to claim 4, wherein the at least one cleaning device is provided with a chamfered guiding surface which interacts with corresponding chamfered surfaces of the locking ring and a raising of the central hollow part, and wherein a gap is provided between the corresponding chamfered surfaces to center the at least one cleaning device between the locking ring and the raising of the central hollow part.

6. The mix proof valve according to claim 1 or claim 2, wherein the at least one cleaning device is rotationally arranged on a piping extending parallel to the central hollow part, wherein the cleaning media is fed to the at least one cleaning device through the interior of the piping.

7. The mix proof valve according to claim 6, wherein the at least one cleaning device is rotationally locked to the piping by a ball bearing arrangement.

8. A cleaning arrangement for cleaning a drain area of a valve with a cleaning media, wherein the cleaning arrangement includes at least one cleaning device, which is arranged in a mix proof valve comprising at least a valve body, one or more valve seats, a first valve plug with a first stem and a second valve plug with a second stem, the second valve plug co-operating via the second stem and a struts arrangement with a central hollow part for guiding the first stem, wherein the at least one cleaning device is rotationally arranged inside the valve body, wherein the at least one cleaning device is rotated by pressurized cleaning media and wherein the at least one cleaning device is provided with a screen arrangement creating a spray of cleaning media for cleaning the drain area of the valve.

* * * * *